United States Patent [19]

Sekmakas et al.

[11] 4,075,133
[45] Feb. 21, 1978

[54] ACIDIC COPOLYMERS BASED ON GLYCIDYL ALLYL POLYETHERS ADAPTED FOR ANIONIC ELECTRODEPOSITION

[75] Inventors: Kazys Sekmakas, Chicago; Raj Shah, Schaumburg, both of Ill.

[73] Assignee: DeSoto, Inc., Des Plaines, Ill.

[21] Appl. No.: 710,601

[22] Filed: Aug. 2, 1976

[51] Int. Cl.$^2$ .................. C08L 61/10; C08L 61/28
[52] U.S. Cl. .......................... 260/29.3; 204/181 R; 260/29.4 UA
[58] Field of Search ...... 260/29.4 UA, 29.3, 29.2 EP; 204/181, 874, 876 R, 47 EQ

[56] References Cited

U.S. PATENT DOCUMENTS

| 3,471,388 | 10/1969 | Koral | 204/181 |
| 3,516,913 | 6/1970 | Sekmakas et al. | 204/181 |
| 3,624,013 | 11/1971 | Sekmakas | 260/18 |
| 3,663,484 | 5/1972 | Broecker et al. | 260/29.4 R |

Primary Examiner—Theodore E. Pertilla
Attorney, Agent, or Firm—Dressler, Goldsmith, Clement, Gordon & Shore, Ltd.

[57] ABSTRACT

Acidic copolymers formed by copolymerizing monoethylenic monomers with a polyethylenically unsaturated polyether formed by reacting allyl glycidyl ether with a phenolic OH terminated intermediate produced by reacting a diepoxide with excess bisphenol have been found to be unusually adapted to anodic electrodeposition where substantially the same polyethylenically unsaturated polyether formed by direct etherification using allyl alcohol does not provide satisfactory results.

15 Claims, No Drawings

ACIDIC COPOLYMERS BASED ON GLYCIDYL ALLYL POLYETHERS ADAPTED FOR ANIONIC ELECTRODEPOSITION

The present invention relates to anodic electrocoating and to acidic copolymers which are uniquely adapted to such purpose.

In application Ser. No. 548,680 filed Feb. 10, 1975, Edward J. Murphy and I disclosed new anodic electrocoating systems in which the acidic polymer has an acid number of less than 60, a conductivity less than 1350 micromhos per cm. and a pH of less than 9.25, whereas conventional practice demanded higher acid number, conductivity and pH. As a result of these changes we pointed out that the bath was more stable and less reactive with carbon dioxide to thereby reduce carbon dioxide absorption and lower polymer hydrolysis, and thus these factors in combination with the reduced polymer acidity provided superior corrosion resistance. Unfortunately, the systems there disclosed, require the selection of oleyl alcohol for best performance, and it would be more economical if allyl alcohol could be used since the etherfication reaction between the unsaturated alcohol and the polyepoxide relied upon in Ser. No. 548,680 requires a large excess of unsaturated alcohol and allyl alcohol is much less costly than oleyl alcohol.

Efforts to use allyl alcohol in place of oleyl alcohol by using the corresponding diallyl ether in place of the dioleyl ether have been made, but the acidic copolymer gelled on reaction with monoepoxide before the acid number could be reduced to an appropriate level. On the other hand, these diallyl ethers were suitable for the production of cationic copolymers for electrodeposition at the cathode. To further this effort, and since the direct etherification reaction is difficult and costly as explained in the copending application of Edward J. Murphy filed June 11, 1976, he succeeded in producing a very similar diether by a different and simpler reaction sequence.

This invention is based on the surprising finding that the diallyl ether produced by the process of the said Murphy application can be used to form acidic copolymers adapted for electrodeposition at the anode, although essentially the same diallyl ethers produced by direct etherification with allyl alcohol are not correspondingly useful.

More particularly and in accordance with this invention, a non-gelled acidic copolymer is formed by copolymerizing in organic solvent solution, monoethylenically unsaturated monomers including carboxy functional monomer with a polyethylenically unsaturated polyether formed by reacting a starting polyepoxide with about one mole of a bisphenol per epoxy equivalent in the polyepoxide to substantially consume the epoxy functionality and provide an intermediate carrying phenolic OH terminal groups (one for each epoxy group initially present). This phenolic OH terminated intermediate is then reacted with a molar excess of a polymerizable ethylenically unsaturated monoepoxide, preferably one which is monoethylenic, such as allyl glycidyl ether. The reaction is again between the phenolic OH group and the epoxide group, and this provides a polyethylenic polyether without using unsaturated alcohols in a direct etherification reaction.

Since organic solvent-soluble copolymers are desired herein, the starting polyepoxide preferably does not contain more than about 2.0 epoxy groups per molecule, and is preferably a diglycidyl ether of a bisphenol. The term "a bisphenol", is well known and denotes a pair of phenolic groups coupled together through an intervening alkylene group which may contain from 1–20 carbon atoms, preferably from 2–6 carbon atoms.

The preferred diepoxides are sometimes available as mixtures of monoepoxides and diepoxides having a 1,2-epoxy equivalency of from 1.2 to about 2.0, preferably from 1.4 to 2.0. Bisphenol A is the usual commercial bisphenol and is preferred, both in the polyepoxide, and also in the bisphenol reactant. Commercial materials of the type noted are available in commerce, Epon 828, Epon 1001 (Shell Chemical Company) and Araldite 6010 (Ciba-Geigy) being illustrative. These products are diglycidyl ethers of bisphenol A having an epoxy equivalency of about 2.0.

The bisphenol reactant can be any bisphenol as previously defined, the preferred bisphenol A being 2,2'-bis(p-hydroxyphenyl) propane. The corresponding derivatives of butane and hexane will further illustrate the class. Also, the hydroxy phenyl can be replaced by hydroxy crescyl.

The reaction is the simple and well known reaction of phenolic OH with the epoxy group, this reaction usually proceeding in the presence of a base, such as an alkali hydroxide, and heat. Indeed, this reaction is commonly carried out using a stoichiometric excess of diepoxide to increase the molecular weight of the epoxy resin. Here, a balance is obtained between the number of epoxy groups and the number of moles of the bisphenol, and the result is the production primarily of a product in which one molecule of bisphenol is positioned at each end of the starting diepoxide.

The reaction consumes substantially all of the epoxy functionality and the product possesses increased molecular weight in comparison with the starting reactants. Because there is an increase in molecular weight and because solvent soluble copolymers are contemplated herein, the starting diepoxide preferably has a molecular weight of less than 1000, most preferably less than 500. Diepoxides which are liquids or semi-solids at room temperature such as Epon 828 are particularly preferred.

As a matter of reaction procedure, it is best to add the diepoxide slowly to the hot bisphenol containing the alkali metal hydroxide catalyst. This maintains the bisphenol reactant in excess until diepoxide addition is complete, and this helps to minimize molecular weight.

A molar excess of ethylenically unsaturated monoepoxide (preferably a stoichiometric amount based on phenolic OH) is then added, and the same epoxy-phenolic OH reaction begins again, now being fueled by the added monoepoxide. This produces a polyethylenic polyether.

Allyl glycidyl ether is the particularly preferred ethylenically unsaturated monoepoxide, but methallyl glycidyl ether is also useful. In conformity with conventional usage, the language "ethylenically unsaturated monoepoxide" negates the presence of any reactive functionality other than the ethylenic unsaturation and the single epoxide group. Other polymerizable ethylenically unsaturated monoepoxides are not now available in commerce, but they react in the same way as the preferred allyl glycidyl ether. Thus, one can react sodium linoleate with epichlorohydrin to form an ester, and then remove sodium chloride. The product would be an ethylenically unsaturated monoepoxide fully operative herein. The monoethylenic monoepoxides are preferred.

A molar excess of the unsaturated monoepoxide is used to provide a polyethylenic product. Preferably, most or all of the phenolic OH groups are reacted with a stoichiometric proportion of monoepoxide to provide from 1.2 to 2.0 unsaturated groups per molecule.

Excess unreacted allyl glycidyl ether is not desired, but small amounts may be tolerated since the product is copolymerized with monoethylenic monomers. The unreacted allyl glycidyl ether is simply consumed in the polymerization to form part of the copolymer product.

It is desired to point out that this invention is not broadly concerned with the provision of water dispersible carboxyl-functional copolymers since the capacity of carboxyl-functional copolymers to be dispersed in water with the aid of a base is itself well known. Instead, copolymers adapted to provide superior electrocoat baths are intended, and this requires copolymers which will electrodeposit at the anode in the form of an adherent continuous film. The prior art allyl ether can be used to form solvent soluble acidic copolymers which disperse in water with the aid of a base, but these do not form a continuous film on electrodeposition.

As a practical matter, the acidic copolymers will have an acidic number of from about 12 to about 100, and the electrocoating bath will have a conductivity of less than 1800 micromhos per centimeter and a pH in the range of 8-10. In preferred practice herein, at least 10% of the copolymer will be constituted by carboxyfunctional monomers and at least 15% of the copolymer will be monoepoxide adducted with the excess carboxyl groups to lower the acid number into the range of 12-60, preferably 40-55. This enables the provision of electrocoating baths having a conductivity of less than 1350 micromhos per centimeter, desirably 800-120, and the bath pH is less than 9.25, preferably pH 8.5-9.0.

Referring more particularly to the copolymers which are used herein, the polyethylenic polyether is copolymerized in organic solvent solution, with monoethylenically unsaturated monomers including a proportion of carboxyl-functional monomer to produce a carboxylic acid copolymer solution. The solution copolymerization is itself conventional, the organic solvent being selected to be water miscible to ease the subsequent solubilization in water with the aid of an acid. Any water miscible organic solvent may be utilized, such as methyl ethyl ketone, or 2-ethoxy ethanol, and the like.

The unsaturated hydroxy functional polyether should constitute from 5-75% of the copolymer, preferably from 20-60%. The balance of the copolymer should consist essentially of copolymerizable monoethylenically unsaturated monomers, a portion of which is carboxyl-functional to provide the desired acid number.

Considering the balance of the copolymer which consists essentially of monoethylenic monomers, and directing attention first to the monomers which are not carboxyl-functional, these may be reactive or nonreactive, but the nonreactive monomers are preferred to constitute from about 50 up to about 85% of the monoethylenic monomers. Particularly preferred are styrene or vinyl toluene, or a mixture thereof. Monoethylenic carboxylic acid esters and diesters are also useful, such as butyl methacrylate, ethyl acrylate, dibutyl maleate, etc., but these are less preferred.

The class of monoethylenically unsaturated carboxylic acids is itself well known, acrylic acid being preferred and used as illustrative. Other useful carboxylic acids are illustrated by methacrylic acid, crotonic acid, itaconic acid, fumaric acid, monobutyl maleate, etc. The monocaroxylic acids are preferred.

These acids can be used in an amount to directly provide the desired acid number, but it is preferred to use excess acid, desirably constituting at least 10% of the copolymer, preferably at least 15% of the copolymer. It is particularly preferred that the balance of the monoethylenic monomers, aside from the carboxylic monomer, consist essentially of styrene or vinyl toluene.

Other water soluble reactive monoethylenic monomers may also be present, such as acrylamide, N-methylol acrylamide, or hydroxy ethyl acrylate, and this helps the ultimate cure, though the presence of such other reactive monomers is not needed herein.

As previously indicated, the carboxylic acid copolymer preferably contains more acidity than is desired and this is corrected by reaction with a stoichiometric deficiency of a monoepoxide which may be any monoepoxide as pointed out in U.S. Pat. No. 3,516,913. In preferred practice, a long straight chain monoepoxide containing at least 12 carbon atoms is selected, as disclosed in application Ser. No. 309,654, filed Nov. 27, 1972. The long straight chain provided by the monoepoxide would normally not contain in excess of about 30 carbon atoms, and would preferably contain from 14-22 carbon atoms. A mixture of olefin monoepoxides which contain from 14-16 carbon atoms is particularly preferred.

The capacity to disperse the hydroxy functional acidic resins in water utilizing salt formation with a base, normally a nitrogenous base such as an amine, is aided by the presence of water miscible organic solvent. It will be appreciated that the choice of the base used for salt formation as well as the utilization and selection of water miscible organic solvents are common knowledge in the electrocoating art. The conventional amines, such as triethyl amine or triethanol amine may be used, or weaker bases than are usual can also be accommodated. Water miscible organic solvents are illustrated by methyl ethyl ketone, lower alcohols such as isopropyl alcohol, ether alcohols such as 2-ethoxy ethanol or 2-butoxy ethanol, and the like. They normally constitute at least 12% of the weight of resins dispersed in the water phase, but preferably not more than 50% on the same basis.

It should be observed that the resin which is electrodeposited herein has an epoxy resin backbone with copolymeric growth at more than one end thereof. This provides a complex situation in which small and undefinable variations in resin structure which result from reaction procedure leads to vastly different electrodeposition characteristics.

The aqueous electrocoating baths of this invention are formulated to contain 2-20%, preferably 5-15% of resin solids. Water is the dominating liquid in the bath, but a small proportion of water-miscible organic solvent is also desirably present as previously noted. The resin solids consist essentially of from 60-95%, based on total resin, of the carboxyl functional copolymer previously described, and from 5-40%, based on total resin, of heat-hardening formaldehyde condensate which enable a thermosetting cure to take place on subsequent baking. The preferred proportion of heat-hardening formaldehyde condensate which is dispersed in the aqueous medium is from 10-30%.

The class of heat-hardening formaldehyde condensates is a well known class including aminoplast resins and phenolic resins. Typical aminoplast resins, all of which are formaldehyde condensates, are urea-formaldehyde, hexamethoxy methyl melamine and water dispersible transethers thereof with ethanol or other lower alcohol, benzoguanamine-formaldehyde and the like, including acidic derivatives where the carboxyl group assists solubilization in aqueous alkaline medium. This class of heat-hardening formaldehyde condensates also includes water soluble or dispersible phenolic resins, these being illustrated by the well known nongelled alkaline condensates of phenol with excess formaldehyde known as "A" stage resols. Any of these formaldehyde condensates can be used alone or in any desired mixture thereof. The phenolic resins provide the most outstanding corrosion and detergent resistance and are normally needed to meet commercial standards, but this is not essential herein where the phenolic resins may be omitted while still providing excellent corrosion and detergent resistance.

The films deposited on the anode in accordance with the invention are baked to cure the same, appropriate baking conditions being from 200°–600° F. for periods varying from about 20 seconds at the highest temperatures to about 1 hour at the lowest temperatures. Normally, a baking temperature of at least about 300° F. is used.

The invention will be illustrated in the examples which follow, it being understood that all parts and proportions presented herein are by weight unless otherwise specified.

EXAMPLE I

| Preparation of Epoxy Ether Adduct | | |
|---|---|---|
| (1) | 447 Bisphenol A<br>45 Methyl Ethyl Ketone<br>0.10 Sodium Hydroxide<br>0.55 Water | Charge into reactor<br>Heat to 170° C. using<br>agitation |
| (2) | 362 Diepoxy Resin*<br>40 Methyl Ethyl Ketone | Add Diepoxy solution into reactor over 2 hour period at 170° C. Hold one hour. |
| (3) | 218 Allyl Glycidyl Ether | Add (3) over one hour at 170° C. Hold at 170° C. for 1½ hour, strip off methyl ethyl ketone and cool to 120° C |
| (4) | 300 2-butoxy ethanol | Add (4) |
| | Final characteristics of epoxy ether adduct | |
| | Solids | 77.1% |
| | Viscosity (Gardner-Holdt) | $Z_5$–$Z_6$ |
| | Color (Gardner-Holdt) | 5–6 |

*Diglycidyl Ether of Bisphenol A having an epoxide equivalent weight of 184.

EXAMPLE II

| Preparation of Water Soluble Epoxy-Acrylic Polymer | | |
|---|---|---|
| (1) | 730 Intermediate of<br>130 Example I 2-butoxy<br>ethanol-note 1 | Charge into reactor.<br>Heat to 140° C.<br>using agitation. |
| (2) | 274 Styrene<br>86 Acrylic Acid<br>33 Cumene Hydroperoxide<br>300 oxide 2-butoxy ethanol | Premix and add to reactor over 3 hour period at 140° C. Hold one hour. |
| (3) | 8 Cumene Hydroperoxide | } Add (3) Hold one hour. |
| (4) | 8 Cumene Hydroperoxide | } Add (4) Hold one hour. |

The final characteristics

| Preparation of Water Soluble Epoxy-Acrylic Polymer | |
|---|---|
| Solids: | 63.7% |
| Viscosity (Gardner-Holdt) | $Z_3$–$Z_4$ |
| Color (Gardner-Holdt) | 3–4 |
| Acid Value (nonvolatile) | 54.8 |

Note 1.
This provides a blend of 562.8 grams epoxy diether solids and 297.2 grams 2-butoxy ethanol.

EXAMPLE "A"

| Preparation of Epoxy-Ether Adduct | | |
|---|---|---|
| (1) | 300 Allyl Alcohol<br>1.5 Boron Trifluoride Etherate | Charge into reactor<br>Heat to 90° C. |
| (2) | 3000 Diepoxy Resin Solution* | Add diepoxy solution to reactor over 2–2½ hour period at 90° C. |
| (3) | 300 Allyl Alcohol<br>1.5 Boron Trifluoride Etherate | Add concurrently with (2) to reactor over 2–2½ hour period at 90° C. Hold 1 hour. Slowly raise temperature to 140° C. to strip all solvent (methyl ethyl ketone) and excess of allyl alcohol. Cool. |
| (4) | 670 2-butoxy ethanol | Add (4) |
| | Final characteristics of epoxy ether adduct: | |
| | Solids: | 70.2% |
| | Viscosity (Gardner-Holdt) | $Z_2$–$Z_3$ |
| | Color (Gardner-Holdt) | 2–3 |

*80% solution in methyl ethyl ketone of diglycidyl ether of Bisphenol A having an epoxide equivalent weight of 450–500.

EXAMPLE "B"

| Preparation of Water Soluble Epoxy-Acrylic Polymer | | |
|---|---|---|
| (1) | 800 Product of Example "A"<br>60 2-Ethoxy Ethanol - note 1 | Charge into reactor and heat to 140° C. |
| (2) | 275 Styrene<br>86 Acrylic Acid<br>33 Cumene Hydroperoxide - 70%<br>300 2-Butoxy Ethanol | Premix and add to reactor over a 3 hour period at 140° C. Hold for one hour. |
| (3) | 8 Cumene Hydroperoxide) Add (3) and hold 1 hour at 140° C. | |
| (4) | 8 Cumene Hydroperoxide) Add (4) and hold 1 hour at 140° C. | |
| | The final characteristics are | |
| | Solids: | 64.7% |
| | Viscosity (Gardner-Holdt) | $Z_7$ |
| | Color (Gardner-Holdt) | 2–3 |
| | Acid Value (nonvolatile) | 58.9 |

Note 1
This provides a blend of 561.6 grams of epoxy diether solids and 298.4 grams 2-butoxy ethanol which is substantially the same blend as in Example II.

Evaluation in Electrocoat Films

Preparation of Electrocoating Bath from Epoxy-Acrylic Polymer of Example II (1) 100 grams Epoxy-Acrylic Polymer Solution of Example II (2) 5.6 grams Dimethyl Ethanol Amine (3) 15.9 grams Methylated-ethylated benzoguanamine resin (XM 1123 — American Cyanamid may be used)

(4) 762 grams Deionized water.

Add (1), (2), and (3), mix well, then add (4) slowly with agitation. Total solids of the bath = 9.0%. Bath pH = 9.5

Films are electrodeposited from the above bath onto zinc phosphate-treated steel panels using various deposition voltages, namely, 90 volts, 110 volts, and 130 volts. All of the deposited films are smooth and glossy, have a pencil hardness of 5H, and exhibit excellent flexibility.

In contrast, and utilizing the polymer solution of Example B instead of the polymer solution of Example II, films electrodeposited in the same manner from the same bath (aside from the use of the Example B solution) and utilizing identical voltages, were rough and dry and discontinuous in appearance.

The above films were cured by baking at 400° F for 20 minutes.

It should be noted that the products of Example I and Example A are substantially the same from the standpoint of chemical formula and also from the standpoint of average molecular weights. Thus, by calculation, the Example I product will have an average molecular weight of about 1042. Assuming that the starting epoxy resin in Example A was in the middle of the commercial range of epoxide equivalent weights of from 450–500, then the average molecular weight of the product would be about 1066. The two products should thus be substantially the same, though their behavior in acidic copolymer electrodeposition systems is quite different.

Preferred practice in the invention is illustrated as follows:

EXAMPLE III

| Parts by Weight | Component |
|---|---|
| 700 | 2-butoxy ethanol |
| 425 | Epoxy Ether Adduct of Example I |
| | Charge the above into reactor, heat to 140° C. and set reflux condenser. |
| 550 | Styrene |
| 290 | Acrylic acid |
| 40 | Cumene hydroperoxide |
| | Add the above over a 3½ hour period while maintaining temperature at 140° C. When addition is completed, hold for one hour. |
| 6 | Cumene hydroperoxide - add and hold 1 hour. |
| 6 | Cumene hydroperoxide - add and hold 1 hour. |
| 6 | Cumene hydroperoxide - add and hold 1 hour. |
| 5 | Diisopropanol amine - add |
| 10 | 2-butoxy ethanol - add |
| 550 | Olefin Epoxide 14–16* - add over a 30 minute period. Hold for a constant acid value (20–23). Cool and add 220 parts of isopropanol to provide a product having a solids content of about 61.6%. |

*A mixture of $C_{14}$ and $C_{16}$ 1,2-monoepoxides. The total 1,2-monoepoxide content is 90.79%, 66.52% being $C_{14}$ monoepoxide and 24.27% being $C_{16}$ monoepoxide. The oxirane oxygen content is 6.8%, the iodine number is 2.2, and the acidity is 0.31% as acetic acid.

EXAMPLE IV

Electrocoat System Based on Example III Epoxy Olefin Resin

| | Total Weight | Non-volatile |
|---|---|---|
| Resin Solution of Example III | 100.2 | 61.6 |
| Benzoguanamine-Formaldehyde resin (CLA 1123 - American Cyanamid) | 15.7 | 15.4 |
| Diethyl ethanol amine | 8.6 | |
| TiO$_2$ Anatase (chloride process) pigment | 23.0 | 23.0 |
| Deionized Water | 852.5 | |
| | 1000.00 | 100.0 |

The pigment is ground into the resin solution, the benzoguanamine-formaldehyde resin is added, the amine is then added, and the mixture is then let down with water to provide a bath pH of 8.8, a conductivity of 1100 micromhos per cm, and a solids content of 10%.

Electrodeposition onto zinc phosphate-treated steel panels at 120 volts followed by curing at 400° F for 20 minutes produces a hard, smooth and glossy continuous film which exhibits excellent corrosion resistance.

The invention is defined in the claims which follow:

1. An aqueous electrocoating bath comprising water having dispersed therein from 2–20% by weight of resin solids consisting essentially of:
   (A) from 60–95%, based on total resin, of a carboxyl-functional copolymer of:
      (1) from 5–75% of the copolymer of a polyethylenic polyether containing from about 1.2 to about 2.0 ethylenically unsaturated groups per molecule, said polyethylenic polyether being formed by reacting a polyepoxide which is a polyglycidyl ether of a bisphenol having a 1,2-epoxy equivalency of from 1.2 to about 2.0 with about one mole of a bisphenol per epoxy equivalent in said polyepoxide to consume the epoxy functionality by reaction with the phenolic OH group in said bisphenol and provide an intermediate carrying phenolic OH terminal groups, and then reacting phenolic OH terminal groups in said intermediate with the epoxy group in a molar excess of an ethylenically unsaturated monoepoxide;
      (2) the balance of the copolymer consisting essentially of copolymerizable monoethylenically unsaturated monomers including carboxy-functional monomer, said copolymer having an acid number in the range of about 12 to about 100 and being dispersed in said aqueous bath with the aid of a base and water miscible organic solvent; and
   (B) from 5–40%, based on total resin, of a heat-hardening formaldehyde condensate selected from the group of aminoplast resins and water dispersible phenolic resins; said bath having a pH in the range of 8–10 and a conductivity of less than 1800.

2. An electrocoating bath as recited in claim 1 in which said intermediate carrying phenolic OH terminal groups is reacted with a stoichiometric proportion of a monoethylenic monoepoxide.

3. An electrocoating bath as recited in claim 2 in which said monoepoxide is allyl glycidyl ether.

4. An electrocoating bath as recited in claim 3 in which said polyepoxide is a diglycidyl ether of a bisphenol and has a molecular weight of less than 1000.

5. An electrocoating bath as recited in claim 4 in which said polyepoxide has a molecular weight of less than 500.

6. An aqueous electrocoating bath comprising water having dispersed therein with the aid of a base, from 2–20% by weight of resin solids consisting essentially of:
   (A) a carboxyl-functional copolymer produced by copolymerization in organic solvent solution of:
      (1) from 20–60% of the copolymer of a polyethylenic polyether containing from about 1.4 to about 2.0 ethylenically unsaturated groups per molecule, said polyethylenic polyether being formed by reacting a diglycidyl ether of a bisphenol having a 1,2-epoxy equivalency of from 1.2 to about 2.0 and a molecular weight less than 1000 with about one mole of a bisphenol per epoxy equivalent in said polyepoxide to consume the epoxy functionality by reaction with the phenolic OH group in said bisphenol and provide an intermediate carrying phenolic OH terminal groups, and then reacting the phenolic OH terminals groups in said intermediate with the epoxy group in an approximately stoichiometric proportion of allyl or methallyl glycidyl ether;

(2) the balance of the copolymer consisting essentially of copolymerizable monoethylenically unsaturated monomers including carboxy-functional monomer, said copolymer having an acid number in the range of 12–60 and being dispersed in said aqueous bath with the aid of an amine and from 12–50% of water miscible organic solvent, based on the weight of resins dispersed in the water; and (B) from 5–40%, based on total resin of a heat-hardening formaldehyde condensate selected from the group of aminoplast resins and water dispersible phenolic resins; said bath having a pH in the range of 8–10 and a conductivity of less than 1800.

7. An electrocoating bath as recited in claim 6 in which the balance of the copolymer consists essentially of styrene or vinyl toluene and monoethylenic carboxylic acid.

8. An electrocoating bath as recited in claim 6 in which a portion of the carboxy-functional monomer is adducted with monoepoxide.

9. An electrocoating bath as recited in claim 8 in which said carboxy-functional monomer constitutes at least 10% of the copolymer, and said monoepoxide constitutes at least 15% of the copolymer after adduction.

10. An electrocoating bath as recited in claim 9 in which said monoepoxide is a long straight chain olefin monoepoxide containing at least 12 carbon atoms.

11. An electrocoating bath as recited in claim 9 in which said copolymer adduct has an acid number in the range of 40–50, and said bath has a pH range of 8.5–9.0, and a conductivity in the range of 800–1200 micromhos per cm.

12. An electrocoating bath as recited in claim 9 in which said heat-hardening formaldehyde condensate is constituted by aminoplast resin in the absence of phenolic resin.

13. An electrocoating bath as recited in claim 9 in which said monoepoxide is an olefin oxide containing from 14–16 carbon atoms.

14. An electrocoating bath as recited in claim 6 in which said diglycidyl ether of a bisphenol has a 1,2-epoxy equivalency of about 2.0, said bisphenol in said diglycidyl ether and the bisphenol used for reaction with said diglycidyl ether is bisphenol A, and a stoichiometric proportion of allyl glycidyl ether is used.

15. An electrocoating bath as recited in claim 14 in which said diglycidyl ether of a bisphenol has a molecular weight below 500.

* * * * *

UNITED STATES PATENT OFFICE
CERTIFICATE OF CORRECTION

Patent No. 4,075,133     Dated February 21, 1978

Inventor(s) Kazys Sekmakas and Raj Shah

It is certified that error appears in the above-identified patent and that said Letters Patent are hereby corrected as shown below:

Column 5, line 57 should read --730   Intermediate of Example I)--

Column 5, line 58 should read --130   2-butoxy ethanol-note 1)--

Column 5, line 62 should read -- 33   Cumene Hydroperoxide)--

Column 5, line 63 should read --300   2-butoxy ethanol)--

Signed and Sealed this

Twenty-third Day of May 1978

[SEAL]

Attest:

RUTH C. MASON
Attesting Officer

LUTRELLE F. PARKER
Acting Commissioner of Patents and Trademarks